(No Model.)
C. VAN DUSEN.
NUT LOCK.
No. 292,601. Patented Jan. 29, 1884.
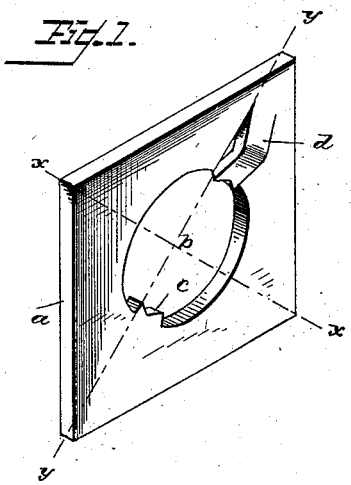
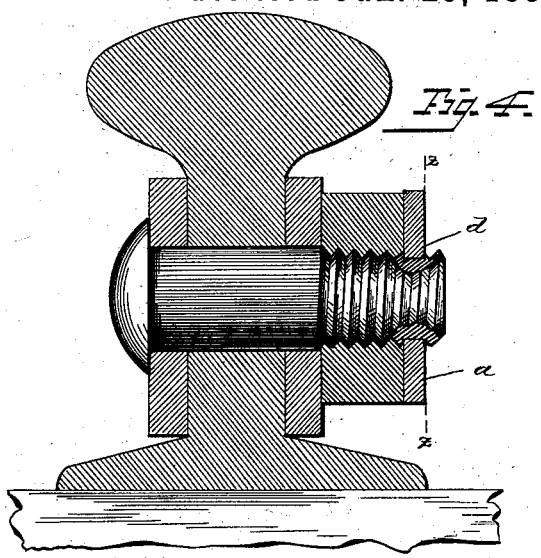
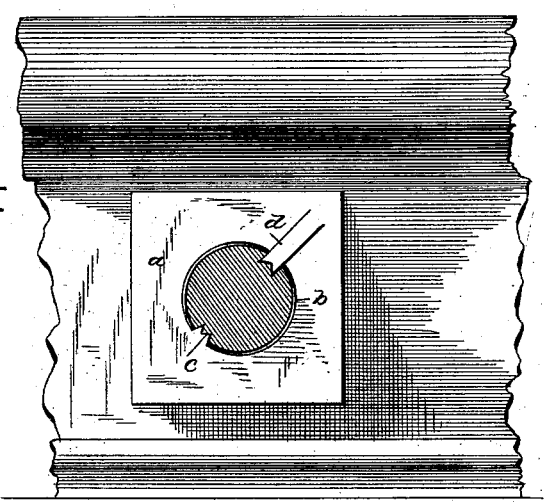
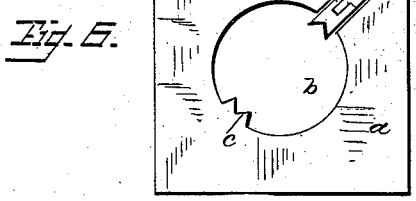
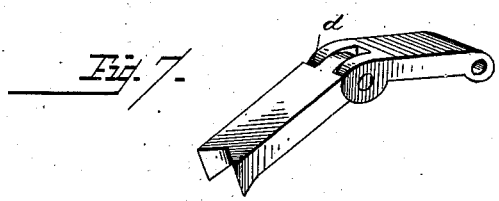
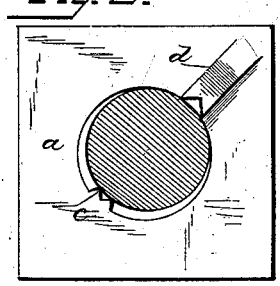
WITNESSES
Franck L. Ourand
Edwin A. Finckel
INVENTOR
Charles Van Dusen
by Wm H. Finckel
Attorney.

UNITED STATES PATENT OFFICE.

CHARLES VAN DUSEN, OF NEW ALBANY, INDIANA, ASSIGNOR OF ONE-HALF TO WILLIAM L. BREYFOGLE, OF LOUISVILLE, KENTUCKY.

NUT-LOCK.

SPECIFICATION forming part of Letters Patent No. 292,601, dated January 29, 1884.

Application filed June 30, 1883. (No model.)

*To all whom it may concern:*

Be it known that I, CHARLES VAN DUSEN, a citizen of the United States, residing at New Albany, in the county of Floyd and State of Indiana, have invented certain new and useful Improvements in Nut-Locks, of which the following is a full, clear, and exact description.

This invention is in the nature of improvements in devices for locking the nuts of bolts to said bolts, so as to obviate the danger of the running off of the nuts incident to usage—as, for example, in railroad-rail joints, where the constant jarring of the car-wheels upon the rails loosens the nuts and dismembers the joint; but it will be obvious that my invention is of general applicability.

My invention consists in a top nut-locking washer provided with a bolt-hole larger than the circumference of the bolt to which it is to be applied, having teeth or spurs to enter and break the threads of the bolt, and a lever member, also toothed or pointed to engage the bolt's threads, and adapted to be forcibly moved toward the bolt, to thereby embed the spurs and its own point in the bolt, and so be rigidly applied to the bolt outside the nut, substantially as hereinafter particularly set forth and claimed.

In the accompanying drawings, illustrating my invention, in the several figures of which like parts are similarly designated, Figure 1 is a perspective view of one form of my washer; Fig. 2, a cross-section thereof on the line $x\,x$, Fig. 1. Fig. 3 is a top plan view of my washer in position to be applied to a bolt, the bolt being shown in cross-section. Fig. 4 is a cross-section of a railroad-rail joint, showing my washer applied, the section of the washer being on the line $y\,y$ of Fig. 1. Fig. 5 is a sectional side elevation taken on the line $z\,z$, Fig. 4. Fig. 6 is a top plan view of another form of my washer, and Fig. 7 a perspective view of the lever member of the washer detached.

In practicing my invention I take plates of iron or steel—say one-eighth of an inch thick, or about the width of two threads of the screw-bolt on which they are to be used—and cut therefrom pieces of about the sizes and shapes of the nuts for which they are to be used. These pieces I designate "washers" $a$, and I make in such washers a hole, $b$, larger than sufficient to slip it upon a bolt. On the edge of this hole are left one or more V-shaped or edged points, spurs, or projections, $c$, extending into the hole only sufficiently to permit the passage of the bolt between them and the opposite edge of the hole. Opposite these points in the washer is arranged a tongue or lever member, $d$, which, in the form shown in Figs. 1, 3, 4, and 5, is cut from the washer along its longitudinal edges, and hence integral therewith, but which, as shown in Figs. 6 and 7, may be a knuckle-jointed device pivoted in a recess or slot in the washer. The end of this lever member extending into the hole $b$ is preferably edged, toothed, or pointed, as shown. This lever projects into the hole $b$; but in the case of the integral tongue it is bent up, so as to bring its point in the circle of the hole, and in the case of the knuckle-joint it is easily raised into that position. The spurs $c$ and lever member $d$ are preferably arranged in diagonal corners of the washer, for strength.

In using my washer thus constructed the nut is applied to the bolt and screwed up into position. The washer $a$ is then applied to the bolt outside or on top the nut, and when as close to the nut as it can be brought, force—as a blow with a hammer—is applied to the tongue or lever member $d$ until it is straightened out into or nearly into the plane of the washer, and, using the bolt as a fulcrum, the washer is driven back longitudinally of the lever member, and the teeth or spurs $c$ thereby drawn into one or more threads of the bolt, and the teeth, point, or spurs of the lever member likewise driven into the threads of the bolt, thus securely attaching the washer to said bolt, and thereby locking the nut to the bolt. The washer may be detached by prying out the lever member.

I prefer to bevel the spurs $c$ and also the lever member spurs after the manner indicated in Fig. 2, as thereby the said spurs get a better hold on the threads and are less liable to move. The form of spurs I prefer are V-shaped, with a conical vertical space between them and inclined outer surfaces, the base of the conical space being inverted. Spurs so shaped will enter the threads of the bolt in such a manner as to preclude, so far as my present experience shows, the accidental movement of the washer.

If the washers are to be applied to bolts of soft metal, they are preferably hard, or their spurs are hard, and vice versa, as better results follow.

I have thus brought within a single simple device all the members, movable and fixed, of a very efficient, cheap, and quickly-applied nut-lock. If the washer be removed with care, it can be repeatedly reused, and such removal can be effected most readily by lifting the washer by that end containing the lever member.

What I claim is—

1. A nut-locking washer provided with a bolt-hole having a spur or spurs extending therein, and a lever member movable to draw said spurs into the threads of the bolt to lock the washer, substantially as shown and described.

2. The combination, with the plate $a$, of beveled spurs $c$, projecting into its bolt-hole, and means, substantially as described, to draw said spurs into engagement with the bolt to which it is applied to lock the nut, as set forth.

3. The combination, with the plate $h$, having a bolt-hole, $b$, and spurs $c$, projecting into said bolt-hole, of the tongue or lever member $d$, struck up from said plate opposite said spurs, substantially as and for the purpose described.

4. The combination, with the plate $a$, having a bolt-hole, $b$, of spurs $c$, projecting into the said hole, and the tongue or lever member $d$, the said spurs and lever member being arranged in the line of diagonal corners of the plate, substantially as shown and described.

In testimony whereof I have hereunto set my hand this 25th day of June, A. D. 1883.

CHARLES VAN DUSEN.

Witnesses:
W. H. BERKELE,
JNO. K. FAULKNER, Jr.